United States Patent
Park et al.

(10) Patent No.: US 11,796,780 B2
(45) Date of Patent: Oct. 24, 2023

(54) STRUCTURE AND METHOD FOR UTILIZING NATURAL LIGHT IN AN INTERIOR OF A MOVING SPACE

(71) Applicants: HYUNDAI MOTOR COMPANY, Seoul (KR); KIA CORPORATION, Seoul (KR)

(72) Inventors: Soon Sung Park, Seoul (KR); Kwang Ok Jeon, Suwon-si (KR); Dae Sun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 106 days.

(21) Appl. No.: 17/532,782

(22) Filed: Nov. 22, 2021

(65) Prior Publication Data
US 2022/0342192 A1 Oct. 27, 2022

(30) Foreign Application Priority Data
Apr. 23, 2021 (KR) .......... 10-2021-0052977

(51) Int. Cl.
| G02B 19/00 | (2006.01) |
| F21S 11/00 | (2006.01) |
| B60Q 3/208 | (2017.01) |
| F21S 19/00 | (2006.01) |

(52) U.S. Cl.
CPC .......... *G02B 19/0042* (2013.01); *B60Q 3/208* (2017.02); *F21S 11/007* (2013.01); *F21S 19/005* (2013.01)

(58) Field of Classification Search
CPC ............ G02B 19/0042; G02B 19/0038; B60Q 3/208; F21S 11/007; F21S 19/005
USPC .................................................. 362/488, 471
See application file for complete search history.

(56) References Cited

U.S. PATENT DOCUMENTS

| 2005/0105297 | A1* | 5/2005 | Suzuki | B60Q 3/76 362/490 |
| 2008/0080190 | A1* | 4/2008 | Walczak | F21V 14/02 362/373 |
| 2015/0043230 | A1* | 2/2015 | Bachhuber | B60Q 3/64 362/477 |
| 2016/0273726 | A1* | 9/2016 | Adler | H05B 45/12 |

FOREIGN PATENT DOCUMENTS

KR 20200124007 A 11/2020

* cited by examiner

*Primary Examiner* — Laura K Tso
(74) *Attorney, Agent, or Firm* — LEMPIA SUMMERFIELD KATZ LLC (57) ABSTRACT

A structure and method for utilizing natural light indoors or in the interior in a moving space are disclosed. The structure includes: at least one natural light condenser configured to reflect the natural light; a natural light transmitter configured such that the natural light reflected by the at least one natural light condenser is moved to the natural light transmitter; a smart lamp unit including an artificial light generator; a smart lamp driver located adjacent to the smart lamp unit and configured to move the smart lamp unit; and a controller connected to the at least one natural light condenser, the natural light transmitter, the smart lamp unit, and the smart lamp driver so as to transmit and receive information therewith. The controller is configured to combine artificial light with the natural light in response to a user request signal to radiate a combination of the artificial and natural light.

10 Claims, 5 Drawing Sheets

— · — : NATURAL LIGHT

[ Section A-A' ]

FIG. 4

[ Section B-B' ]

STRUCTURE AND METHOD FOR UTILIZING NATURAL LIGHT IN AN INTERIOR OF A MOVING SPACE

CROSS-REFERENCE TO RELATED APPLICATION

This application claims under 35 U.S.C. § 119(a) the benefit of priority to Korean Patent Application No. 10-2021-0052977 filed on Apr. 23, 2021, the entire contents of which are incorporated herein by reference.

BACKGROUND

(a) Technical Field

The present disclosure relates to a structure and method for utilizing natural light in an interior of a moving space. More particularly, it relates to a structure and method for utilizing natural light in an interior of a moving space in which the structure and method may control an illumination state so as to be appropriate for a multipurpose indoor space. The structure and method for utilizing natural light in an interior of a moving space may maximally utilize natural light using a natural light condenser and a natural light transmitter and supplement artificial light when the amount of natural light is not sufficient so as to effectively manage power for illumination.

(b) Background Art

In general, lighting apparatuses are installed in the interior of a vehicle so as to illuminate the interior of the vehicle. The vehicle interior lighting apparatuses generally include a front room lamp, a dome room lamp, reading lamps, etc. Fluorescent lamps or light emitting diodes (LEDs) configured to emit monochromatic light are applied as the conventional vehicle interior lighting apparatuses.

Light emitted by the conventional vehicle interior lighting apparatuses is artificial monochromatic light, and thus bothers passenger eyes. Therefore, various lighting apparatuses, configured to set various lighting environments so as to direct change in more anthropocentric natural illumination in the interior of a vehicle and to selectively control brightness so as to provide these lighting environments, are being developed and applied. For example, brightness of illumination may be selectively adjusted using a dimming function. Further, even in this case, only brightness may be adjusted, but change in natural light is not capable of being directed and illumination is not capable of being adjusted depending on various indoor situations.

Recently, for the convenience of a vehicle user, various sensors and electronic apparatuses tend to be provided in vehicles. Particularly, for user convenience in driving, advanced driver assistance systems (ADASs) are being vigorously researched. Further, autonomous vehicles are being actively developed.

Further, purpose-built vehicles (hereinafter referred to as 'PBVs') are emerging as future mobility devices which extend living spaces. For example, when a PBV including a shoe store and a clothing store docks with a hub, the hub becomes a shopping center. The functions of PBVs according to purposes thereof and design extensibility of PBVs are considerable. A PBV is a new type of a mobility device other than public transportation, such as buses, and private vehicles, and is used as a flexible space such that the purpose of a hub varies depending on the purpose of a PBV docking with the hub.

In order to acquire higher utility of such an autonomous vehicle or a PBV, when the autonomous vehicle or the PBV is used for personal purposes or in the service industry, an effective lighting system which is appropriate to a specific situation is required. For example, illumination needs to be adjusted such that natural light is maximally utilized in a situation, such as during resting, in everyday life or indoor plant cultivation, and artificial light is used in a situation, such as during sleeping, watching movies, or refreshing.

As environmental regulations are strengthened and energy cost is reduced around the world, the use of eco-friendly electric vehicles (EVs) has increased. In an electric vehicle, it is necessary to effectively use the power consumed by the overall system of the electric vehicle. As one method for satisfying this, natural light illumination and artificial light illumination may be operated in combination so as to maintain necessary illuminance, thereby being capable of reducing power consumption and supporting stable illumination. Therefore, a lighting system that may control output of artificial light by confirming a degree of condensation of natural light and also control the lighting situation of an indoor space so as to realize a target illuminance is required.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art. It is an object of the present disclosure to provide a structure and method for utilizing natural light indoors or in the interior of a moving space. The structure and method may control a proper illumination state so as to be appropriate to a user request signal through a controller. As used herein, indoor, indoors, interior, and the like may be used interchangeably to identify an enclosed or partly area inside of a structure, a vehicle, or the like.

It is another object of the present disclosure to provide a structure and method for utilizing natural light in an interior of a moving space in which the structure and method may maximally utilize natural light using a natural light condenser and a natural light transmitter and supplement artificial light when the amount of natural light is not sufficient.

In one aspect, the present disclosure provides a structure for utilizing natural light in the interior of a moving space. The structure includes: at least one natural light condenser located outside a vehicle and configured to reflect the natural light; a natural light transmitter connected to one end of the at least one natural light condenser and configured such that the natural light reflected by the at least one natural light condenser is moved to the natural light transmitter; a smart lamp unit connected to the natural light transmitter and including an artificial light generator provided at a position of the smart lamp unit, at which the natural light moved to the natural light transmitter is emitted; a smart lamp driver located adjacent to the smart lamp unit and configured to move the smart lamp unit; and a controller connected to the at least one natural light condenser, the natural light transmitter, the smart lamp unit and the smart lamp driver so as to transmit and receive information therewith. The controller is configured to combine artificial light with the natural light in response to a user request signal so as to radiate a combination of the artificial light and the natural light.

In an embodiment, the at least one natural light condenser may include: a first mirror formed in a semicircular shape and configured such that the natural light is incident on an inner surface thereof so as to be reflected thereby; a second mirror spaced apart from the first mirror and configured to reflect the natural light reflected by the first mirror; and a lens located at a lower end of the first mirror and configured to transmit the natural light reflected by the second mirror.

In an embodiment, the smart lamp unit may include: a smart light diffuser provided with the artificial light generator configured to surround the natural light emitted by the natural light transmitter; a first lamp housing configured to surround the smart light diffuser so as to expose an outer surface of the smart light diffuser; and a second lamp housing fixed to a frame of the vehicle and configured to surround the first lamp housing while being spaced apart from the first lamp housing.

In still another embodiment, the smart lamp driver may rotate the first lamp housing based on the second lamp housing.

In yet another embodiment, the at least one natural light condenser and the natural light transmitter may respectively transmit information regarding an amount of the natural light condensed by the at least one natural light condenser and an amount of the natural light transmitted by the natural light transmitter to the controller.

In still yet another embodiment, the structure for utilizing natural light in the interior of a moving space may further include a camera unit configured to detect indoor image information in real time and to transmit the detected image information to the controller in real time.

In a further embodiment, the controller may selectively control an amount of the natural light radiated by the smart light diffuser and an amount of the artificial light radiated by the artificial light generator.

In another further embodiment, the controller may control the smart lamp driver so as to adjust a direction and an amount of movement of the first lamp housing.

In still another further embodiment, the controller may be configured to receive the user request signal and to transmit a signal for controlling radiation amounts of the natural light and the artificial light to the smart light diffuser.

In yet another further embodiment, the controller may be configured to measure an amount of the natural light input to the smart light diffuser and to adjust power supply to the artificial light generator depending on a target illuminance value.

In another aspect, the present disclosure provides a method for utilizing natural light in the interior of a moving space. The method includes: determining, by a controller, whether or not current indoor information is confirmable; determining, by the controller, whether or not the current indoor information coincides with a user request signal, upon determining that the current indoor information is confirmable; controlling, by the controller, radiation amounts of the natural light and artificial light, upon determining that the current indoor information does not coincide with the user request signal; and adjusting, by the controller, a position value of a smart lamp unit.

In an embodiment, the determining, by the controller, whether or not the current indoor information is confirmable may include: determining, by the controller, whether or not a camera unit is capable of sensing the current indoor information; operating an artificial light generator of the smart lamp unit so that the camera unit is capable of sensing the current indoor information, upon determining that the camera unit is not capable of sensing the current indoor information; and analyzing, by the controller, the current indoor information, receiving the user request signal and analyzing an illumination environment optimized for the current indoor information, upon determining that the camera unit is capable of sensing the current indoor information.

In another embodiment, in the determining, by the controller, whether or not the current indoor information coincides with the user request signal, the controller may determine whether or not a result value acquired by analyzing the current indoor information coincides with the user request information and an illumination environment optimized for the current indoor information.

In still another embodiment, the controlling, by the controller, the radiation amounts of the natural light and the artificial light may include: determining, by the controller, whether or not a target illuminance in response to the user request signal is implementable by measuring an amount of natural light input to the smart lamp unit; transmitting, by the controller, a control signal to instruct the smart lamp unit to radiate a combination of the natural light and the artificial light, upon determining that the target illuminance is not implementable with the measured amount of natural light; and receiving, by the smart lamp unit, the control signal and adjusting the radiation amounts of the natural light and the artificial light.

In yet another embodiment, the adjusting, by the controller, the position value of the smart lamp unit may include: determining, by the controller, whether or not illumination light is radiated to the position value corresponding to the user request signal; and transmitting, by the controller, a smart lamp driver moving signal so as to radiate the illumination light to the position value corresponding to the user request signal, upon determining that the illumination light is not radiated to the position value corresponding to the user request signal.

The above and other aspects, features, and embodiments of the disclosure are discussed below.

BRIEF DESCRIPTION OF THE DRAWINGS

The above and other features of the present disclosure are described in detail with reference to certain embodiments thereof illustrated in the accompanying drawings which are given hereinbelow by way of illustration only, and thus are not limitative of the present disclosure, and wherein.

It should be understood that the appended drawings are not necessarily to scale and present a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the disclosure is described in conjunction with embodiments, it should be understood that the present description is not intended to limit the disclosure to the embodiments. On the contrary, the disclosure is intended to cover not only the disclosed embodiments, but also various alternatives, modifications, equivalents, and other embodiments, which may be included within the spirit and scope of the disclosure as defined by the appended claims. The embodiments are provided to make the description of the present disclosure thorough and to fully convey the scope of the present disclosure to those having ordinary skill in the art.

In the following description of the embodiments, it should be understood that the suffixes "unit", "part", and the like indicate units for processing at least one function or operation, and may be implemented using hardware, software or various combinations of hardware and software.

Further, in the following description of the embodiments, when an element or layer is referred to as being "on" or "above" another element or layer, it may be directly on the other element or layer, or intervening elements or layers may be present therebetween. In addition, when an element or layer is referred to as being "under" or "below" another element or layer, it may be directly under the other element or layer, or intervening elements or layers may be present therebetween.

In the following description of the embodiments, terms, such as "first" and "second", are used only to distinguish one element from other elements. These terms should not be construed as being limiting with regard to the sequence thereof.

Moreover, reference numbers and marks in each operation are used only for convenience of description but do not indicate the sequence of the respective operations. The respective operations may be executed in a sequence different from a stated sequence unless the context clearly indicates otherwise.

When a component, device, element, or the like of the present disclosure is described as having a purpose or performing an operation, function, or the like, the component, device, or element should be considered herein as being "configured to" meet that purpose or to perform that operation or function.

Figure 1:
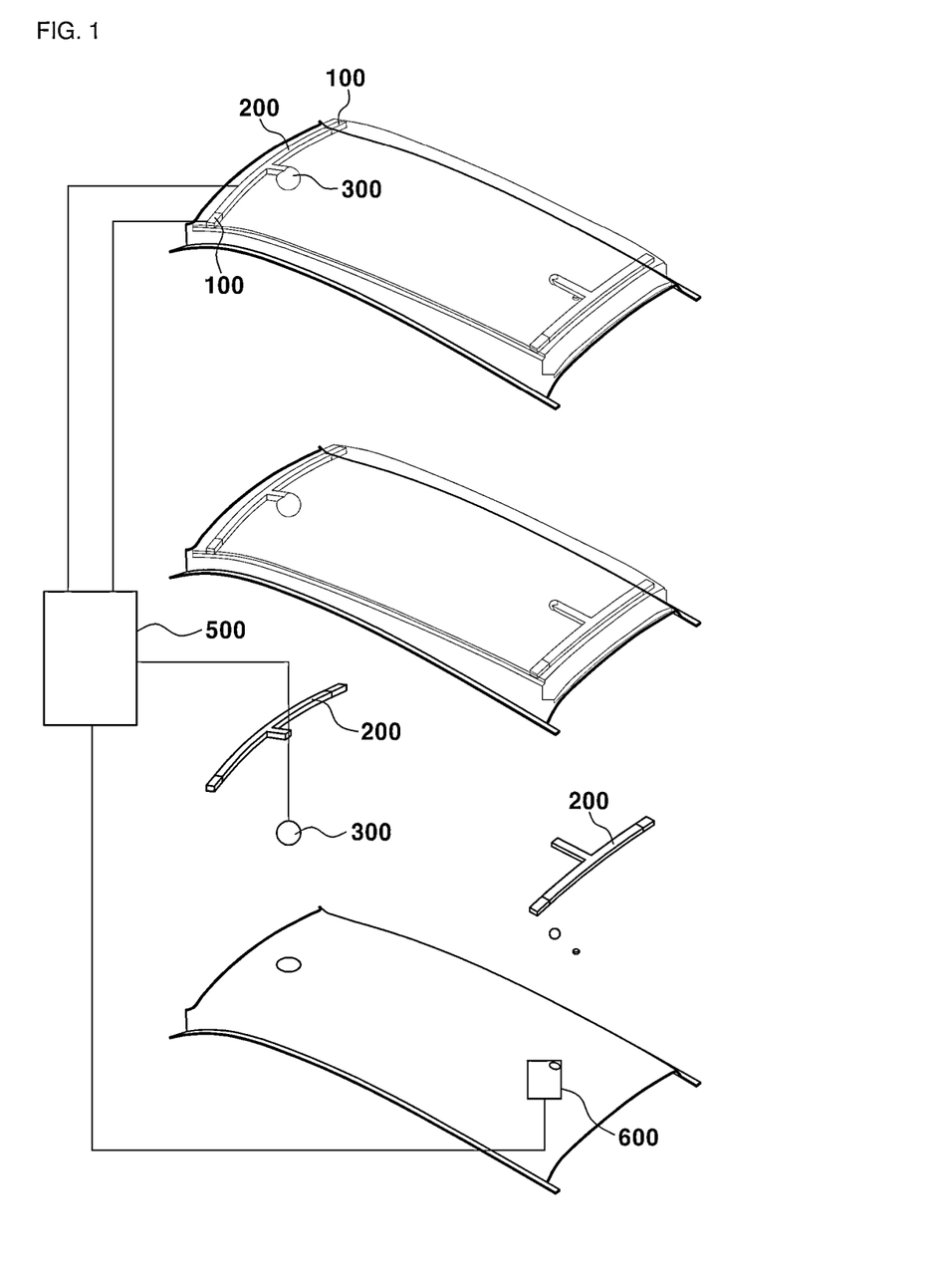
FIG. 1 is an exploded perspective view illustrating the configuration of a structure for utilizing natural light indoors in a moving space according to one embodiment of the present disclosure.
Figure 2:
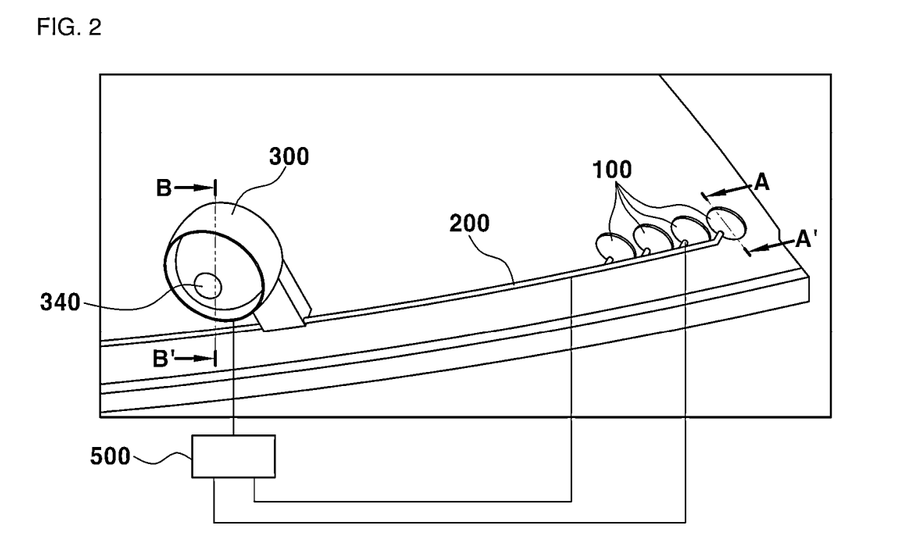
FIG. 2 is a view illustrating natural light condensers, a natural light transmitter and a smart lamp unit of the structure for utilizing natural light indoors according to one embodiment of the present disclosure.

FIG. 1 is an exploded perspective view illustrating the configuration of a structure for utilizing natural light indoors in a moving space according to one embodiment of the present disclosure. FIG. 2 is a view illustrating natural light condensers, a natural light transmitter, and a smart lamp unit of the structure for utilizing natural light indoors according to one embodiment of the present disclosure.

Referring to FIGS. 1 and 2, a structure for utilizing natural light indoors in a moving space according to one embodiment of the present disclosure may include natural light condensers 100, a natural light transmitter 200, a smart lamp unit 300, a smart lamp driver 400, and a controller 500.

A least one natural light condenser 100 may be located outside a vehicle. Natural light condensers 100 may be located at both side ends of the roof of the vehicle so as to condense natural light, as shown in FIG. 1. More particularly, the natural light condenser 100 may be configured to reflect natural light when it is exposed to the natural light. The natural light condenser 100 may adjust an angle of reflection of natural light so as to condense the natural light.

The natural light condenser 100 may be connected to the controller 500. The natural light condenser 100 may be configured to transmit natural light condensation amount information to the controller 500. Natural light may be sunlight incident on the vehicle from outside.

The natural light transmitter 200 may be connected to an end of the natural light condenser 100. The natural light transmitter 200 may extend towards both ends of the roof so as to be connected to ends of the natural light condensers 100 located at both ends of the roof.

The natural light transmitter 200 may be configured such that natural light reflected by the natural light condenser 100 is moved to the natural light transmitter 200. In one embodiment, the natural light transmitter 200 may be optical fiber. In another embodiment, the natural light transmitter 200 may be a flexible pipe. The natural light transmitter 200 is not limited to a specific element as long as it may transmit condensed natural light to the smart lamp unit 300.

One end of the natural light transmitter 200 may be connected to the end of the natural light condenser 100 and the other end of the natural light transmitter 200 may be connected to the smart lamp unit 300. The natural light transmitter 200 may serve as a passage from a position, at which the natural light condenser 100 is located, to a space requiring lighting. The natural light transmitter 200 may be configured to be connected to the controller 500. The natural light transmitter 200 may be configured to transmit natural light transmission amount information to the controller 500.

The smart lamp unit 300 may be connected to the natural light transmitter 200 and be located on the roof of the vehicle. The smart lamp unit 300 may be formed at each of both ends of the roof of the vehicle. The smart lamp unit 300 may be connected to the natural light transmitter 200 and may emit natural light transmitted by the natural light transmitter 200. The smart lamp unit 300 may be configured such that natural light spreads from a portion thereof connected to the natural light transmitter 200 and is scattered and the scattered light is seen from the outside.

The smart lamp unit 300 may be configured to radiate light in a direction, in which light is necessary to radiate, or a direction corresponding to a user request signal, to the inside of the vehicle. Further, the smart lamp unit 300 may be configured to adjust the range of illuminance.

An artificial light generator 340 may be formed at a position of the smart lamp unit 300 at which natural light moved from the natural light transmitter 200 is emitted. The smart lamp unit 300 may be configured to emit a combination of natural light and artificial light. Further, the smart lamp unit 300 may be configured to provide an illumination service using only natural light or using only artificial light when natural light is unavailable.

The artificial light generator 340 may be disposed to surround the portion of the smart lamp unit 300 which emits natural light. When natural light provided by the smart lamp unit 300 is not sufficient, illumination is supplemented using artificial light supplied by the artificial light generator 340 so that illuminance necessary in a specific space may be secured.

The artificial light generator 340 may be, for example, an LED chip. The artificial light generator 340 may be installed to emit artificial light in the same direction as a direction in which natural light is emitted. The artificial light generator 340 may emit artificial light having various wavelengths. For example, when the artificial light generator 340 is an LED chip, artificial light generator 340 may include at least one of a red light source, a blue light source or a white light source, or may include LED chips including a wider variety of color light sources.

The artificial light generator 340 may be configured to receive power supplied under the control of the controller 500. The controller 500 may be configured to adjust the amount of power, i.e., voltage or the amount of current, supplied to the artificial light generator 340. The illuminance of the artificial light generator 340 may be changed depending on the amount of power supplied to the artificial light generator 340.

The smart lamp driver 400 may be located adjacent to the smart lamp unit 300. The smart lamp driver 400 may be connected to the smart lamp unit 300 so as to move the smart lamp unit 300. The smart lamp driver 400 may include, for example, a moving ball and a motor.

The smart lamp driver 400 may be connected to the controller 500. The smart lamp driver 400 may receive a result value of a calculation, which is input from the controller 500, and may drive the smart lamp unit 300 so as to radiate light to a position value corresponding to the user request signal.

As shown in FIG. 1, the natural light condensers 100, the natural light transmitter 200, the smart lamp unit 300, and the smart lamp driver 400 may be embedded between a roof panel and a head lining of the vehicle. The smart lamp unit 300 may be configured such that one end thereof is exposed through a hole formed in the head lining so as to radiate light.

The controller 500 may be connected to the natural light condensers 100, the natural light transmitter 200, the smart lamp unit 300, and the smart lamp driver 400 so as to transmit and receive information therewith. The controller 500 may receive natural light condensation amount information from the natural light condensers 100 and may receive natural light transmission amount information from the natural light transmitter 200. Further, the controller 500 may analyze the illuminance of the interior of the vehicle and may set a light source. The controller 500 may perform calculations relating to control of the artificial light generator 340. Further, the controller 500 may be configured to perform smart dimming control calculations.

The controller 500 may be connected to a personal device, such as a mobile phone or a tablet PC, or a voice recognition unit installed in the vehicle so as to receive a user request signal. Thereby, the controller 500 may be configured to radiate a combination of natural light and artificial light depending on the user request signal. The user request signal may be a signal indicating selection of a lighting mode, adjustment of an amount of light, adjustment of a position value, or the like. Further, the controller 500 may output indoor space state information to the personal device or the voice recognition unit.

The structure for utilizing natural light indoors according to one embodiment of the present disclosure may further include a camera unit 600 installed in the interior of the vehicle. The camera unit 600 may be connected to the controller 500 so as to transmit and receive information therewith. The camera unit 600 may be configured to detect indoor image information in real time and to transmit the detected image information to the controller 500 in real time.

The controller 500 may analyze the kind and position of an object, which is recognized by the camera unit 600, located indoors. Further, the controller 500 may analyze the features or activity of a user, who is recognized by the camera unit 600, located indoors. The camera unit 600 may be located at one end of the roof outside the vehicle so as to sense image information of the entirety of the interior of the vehicle.

Figure 3:
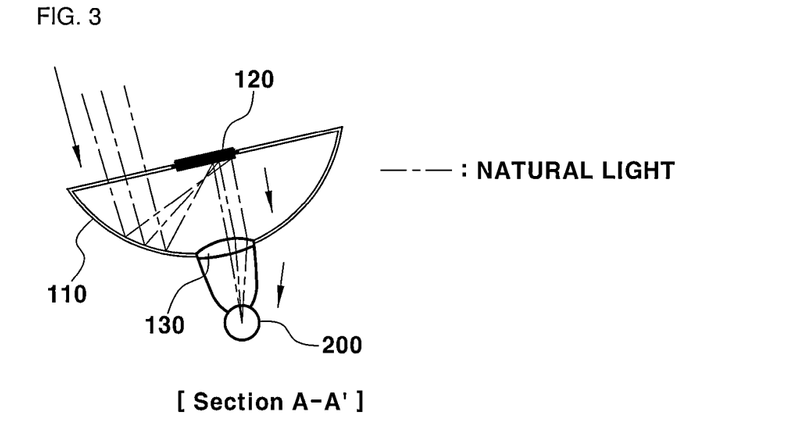
FIG. 3 is a view illustrating the flow of natural light in the natural light condenser of the structure for utilizing natural light indoors according to one embodiment of the present disclosure.

FIG. 3 is a view illustrating the flow of natural light in the natural light condenser 100 of the structure for utilizing natural light indoors according to one embodiment of the present disclosure.

Referring to FIG. 3, the natural light condenser 100 may include a first mirror 110, a second mirror 120, and a lens 130. Natural light incident from the outside may sequentially flow to the first mirror 110, the second mirror 120, and the lens 130. Further, the first mirror 110, the second mirror 120, and the lens 130 may be configured to have an aspherical surface.

The first mirror 110 may be an aspherical mirror having a semicircular shape. The first mirror 110 may be configured such that natural light is incident on the inner surface thereof so as to be reflected thereby. More concretely, the first mirror 110 may be configured such that incident natural light is reflected by the first mirror 110 so as to be condensed onto the second mirror 120.

The second mirror 120 may be located to be spaced apart from the first mirror 110. The second mirror 120 may be located at a position corresponding to the central part of the first mirror 110. The second mirror 120 may be configured to reflect natural light reflected by the first mirror 110. More concretely, the second mirror 120 may be configured to reflect natural light, reflected by the first mirror 110, towards the lens 130.

The first mirror 110 and the second mirror 120 may be formed of a material that does not transmit natural light incident thereon and may reflect the natural light.

The lens 130 may be located at the lower end of the first mirror 110. The lens 130 may be formed at the central part of the first mirror 110 so as to correspond to the position of the second mirror 120. The lens 130 may be spaced apart from the second mirror 120 so that natural light reflected by the second mirror 120 is collected in the lens 130.

The lens 130 may be configured to transmit natural light. The lens 130 may be configured to transmit natural light reflected by the second mirror 120. The lens 130 may be a convex lens which collects light by refracting the light. The natural light transmitter 200 may be connected to the lower end of the lens 130. Natural light refracted by the lens 130 may be moved to the natural light transmitter 200.

Figure 4:
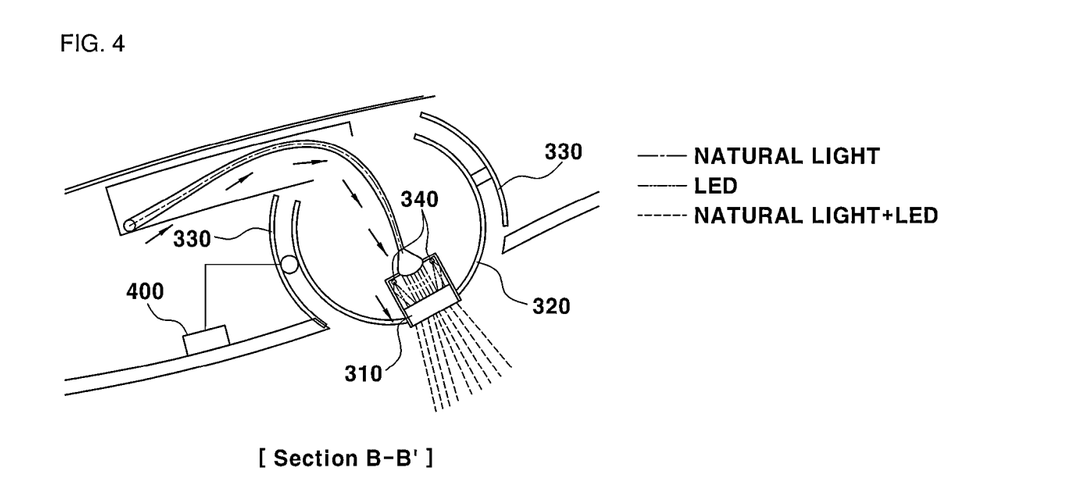
FIG. 4 is a cross-sectional view of the smart lamp unit of the structure for utilizing natural light indoors according to one embodiment of the present disclosure.

FIG. 4 is a cross-sectional view of the smart lamp unit 300 of the structure for utilizing natural light indoors according to one embodiment of the present disclosure.

Referring to FIG. 4, the smart lamp unit 300 may include a smart light diffuser 310, a first lamp housing 320 and a second lamp housing 330. The smart light diffuser 310 may be configured to emit natural light or artificial light, and the first lamp housing 320 and the second lamp housing 330 may be connected to the smart lamp driver 400 so as to adjust an illumination position value.

The artificial light generator 340, which surrounds natural light emitted by the natural light transmitter 200, may be formed at the smart light diffuser 310. Natural light transmitted by the natural light transmitter 200 may be moved to the central part of the smart light diffuser 310 so as to be emitted. The artificial light generator 340 may be formed to surround the end of the natural light transmitter 200. The smart light diffuser 310 may be configured to emit artificial light such that the artificial light emitted by the mart light diffuser 310 surrounds natural light.

The smart light diffuser 310 may include a light guide panel. The light guide panel may be spaced apart from the artificial light generator 340 and be installed in a direction in which artificial light is emitted. The light guide panel may be formed of glass or a polymer which may transmit light. Further, in order to increase light scattering effects so as to uniformly emit light when natural light or artificial light is radiated, a pattern may be formed on the surface of the light guide panel of the smart light diffuser 310. The pattern formed on the surface of the light guide panel may be one of various patterns, including a grid pattern, an embossing pattern, a dot pattern, and a comb pattern, so as to suit a desired purpose.

The controller 500 may be configured to selectively control the amount of natural light radiated by the smart light diffuser 310 and the amount of artificial light radiated by the artificial light generator 340. The controller 500 may receive a user request signal and may transmit a natural and artificial light radiation amount control signal to the smart light diffuser 310. Further, the controller 500 may measure the amount of natural light input to the smart light diffuser 310 and may adjust power supply to the artificial light generator 340 depending on a target illuminance value.

In one embodiment, the controller 500 may control the smart light diffuser 310 so as to radiate only natural light when the amount of natural light transmitted from the natural light transmitter 220 satisfies a user request signal value. In another embodiment, the controller 500 may control the smart light diffuser 310 so as to radiate a combination of natural light and artificial light when the amount of natural light transmitted from the natural light transmitter 220 does not satisfy the user request signal value.

The first lamp housing 320 may be configured to surround the smart light diffuser 310 and to expose the outer surface of the smart light diffuser 310. The first lamp housing 320 may be formed in a circular shape so as to expose the light guide panel of the smart light diffuser 310. The second lamp housing 330 may be fixed to the frame of the vehicle. The second lamp housing 330 may be fixedly installed at the head lining of the roof of the vehicle. The second lamp housing 330 may be formed in a circular shape corresponding to the shape of the first lamp housing 320 so as to surround the first lamp housing 320 while being spaced apart from the first lamp housing 320.

The smart lamp driver 400 may be configured to rotate the first lamp housing 320 based on the second lamp housing 330. In one embodiment, the moving ball may be provided in a space between the first lamp housing 320 and the second lamp hosing 330 and the first lamp housing 320 may be rotated using the moving ball by the motor.

The controller 500 may control the smart lamp driver 400 so as to adjust the direction and the amount of movement of the first lamp housing 320. The controller 500 may receive a user request signal and may control movement of the first lamp housing 320 so as to radiate illumination light to a position value desired by a user.

Figure 5:
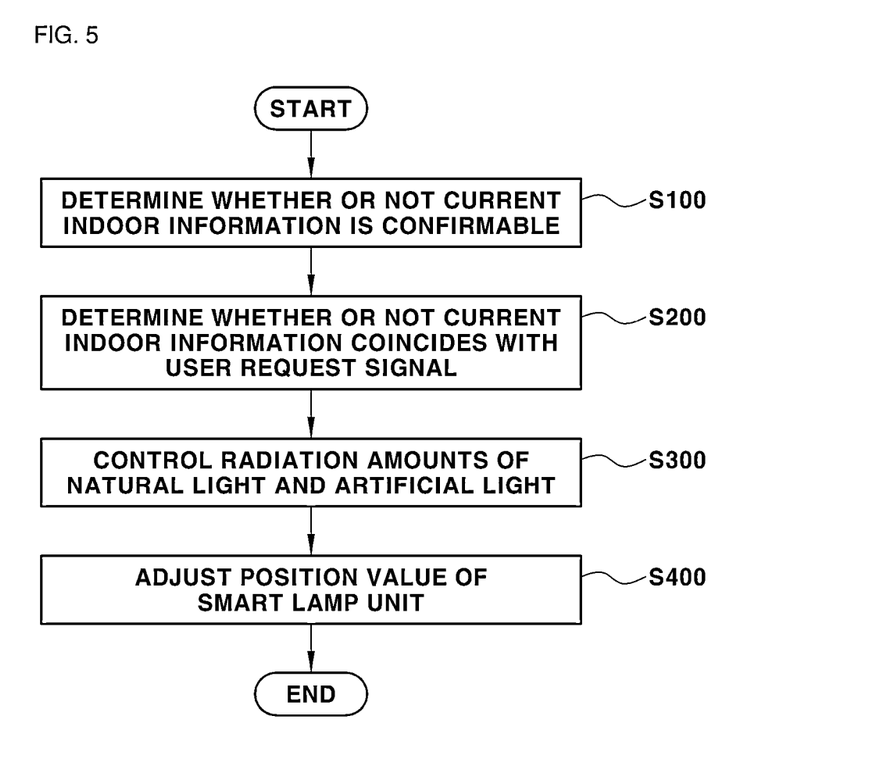
FIG. 5 is a flowchart representing a method for utilizing natural light indoors, i.e., in the interior of a moving space according to one embodiment of the present disclosure.
Figure 6:
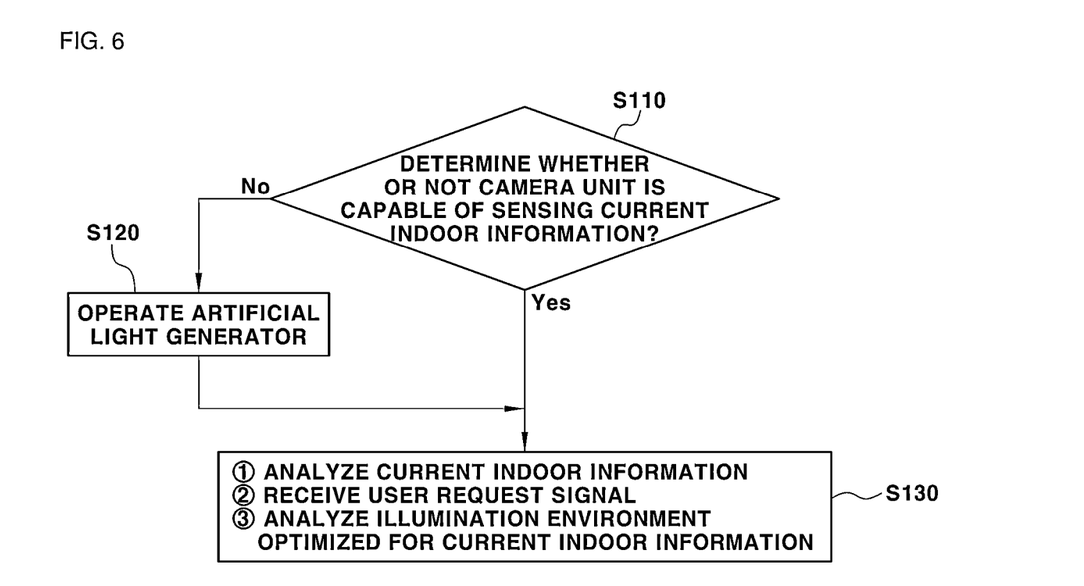
FIG. 6 is a flowchart representing determination as to whether or not current indoor information is confirmable in the method for utilizing natural light indoors according to one embodiment of the present disclosure.

FIG. 5 is a flowchart representing a method for utilizing natural light indoors, i.e., in the interior in a moving space according to one embodiment of the present disclosure. FIG. 6 is a flowchart representing determination as to whether or not current indoor information is confirmable in the method for utilizing natural light indoors according to one embodiment of the present disclosure.

Referring to FIGS. 5 and 6, a method for utilizing natural light in the interior of a moving space according to one embodiment of the present disclosure may include determining, by the controller 500, whether or not current indoor information is confirmable (S100). The method may also include determining, by the controller 500, whether or not the current indoor information coincides with a user request signal upon determining that the current indoor information is confirmable (S200). The method may also include controlling, by the controller 500, radiation amounts of natural light and artificial light upon determining that the current indoor information does not coincide with the user request signal (S300). The method may further include adjusting, by the controller 500, a position value of the smart lamp unit 300 (S400).

The determination as to whether or not the current indoor information is confirmable (S100) may include: determining, by the controller 500, whether or not the camera unit 600 is capable of sensing the current indoor information (S110); operating the artificial light generator 340 of the smart lamp unit 300 so that the camera unit 600 is capable of sensing the current indoor information upon determining that the camera unit 600 is not capable of sensing the current indoor information (S120); and analyzing, by the controller 500, the current indoor information, receiving the user request signal and analyzing an illumination environment optimized for the current indoor information upon determining that the camera unit 600 is capable of sensing the current indoor information (S130).

In the determination as to whether or not the camera unit 600 is capable of sensing the current indoor information (S110), the controller 500 may determine whether or not brightness of the interior of the vehicle is sufficient to sense the kind or position of an object or a user. When the camera unit 600 is not capable of sensing the current indoor information, the controller 500 may operate the artificial light generator 340 of the smart lamp unit 300 so as to generate artificial light sufficient to sense the kind or position of the object or the user. When the camera unit 600 is capable of sensing the current indoor information, the controller 500 may analyze the current indoor information sensed by the camera unit 600. The current indoor information may be information about the object or the user currently located in the interior of the vehicle. Further, in this operation, the controller 500 may receive the user request signal. For example, the controller 500 may receive the user request signal through an application of a user mobile phone or a voice recognition unit installed in the vehicle.

Simultaneously, the controller 500 may analyze the illumination environment optimized for the current indoor information. For example, the controller 500 may analyze a recommended illumination environment optimized for the GPS or the time information of the vehicle.

Upon determining that the current indoor information is confirmable, the controller 500 may determine whether or not the current indoor information coincides with the user request signal (S200). In the determination as to whether or not the current indoor information coincides with the user request signal (S200), the controller 500 may determine whether or not a result value acquired by analyzing the current indoor information coincides with the user request signal and the illumination environment optimized for the current indoor information.

The user request signal may be a request signal input from a device, such as a user smart phone or tablet PC, or be a signal input through a microphone in the vehicle. Alternatively, the user request signal may be a signal relating to an illumination mode, an illumination position, an illumination range, or an illumination amount.

The illumination environment optimized for the current indoor information may be a result value acquired by analyzing a recommended illumination environment optimized for the current position value of the vehicle depending on time information, through the controller 500.

Upon determining that the current indoor information coincides with the user request signal, the controller 500 may maintain the amount of natural light and the amount of artificial light in the current state.

Figure 7:
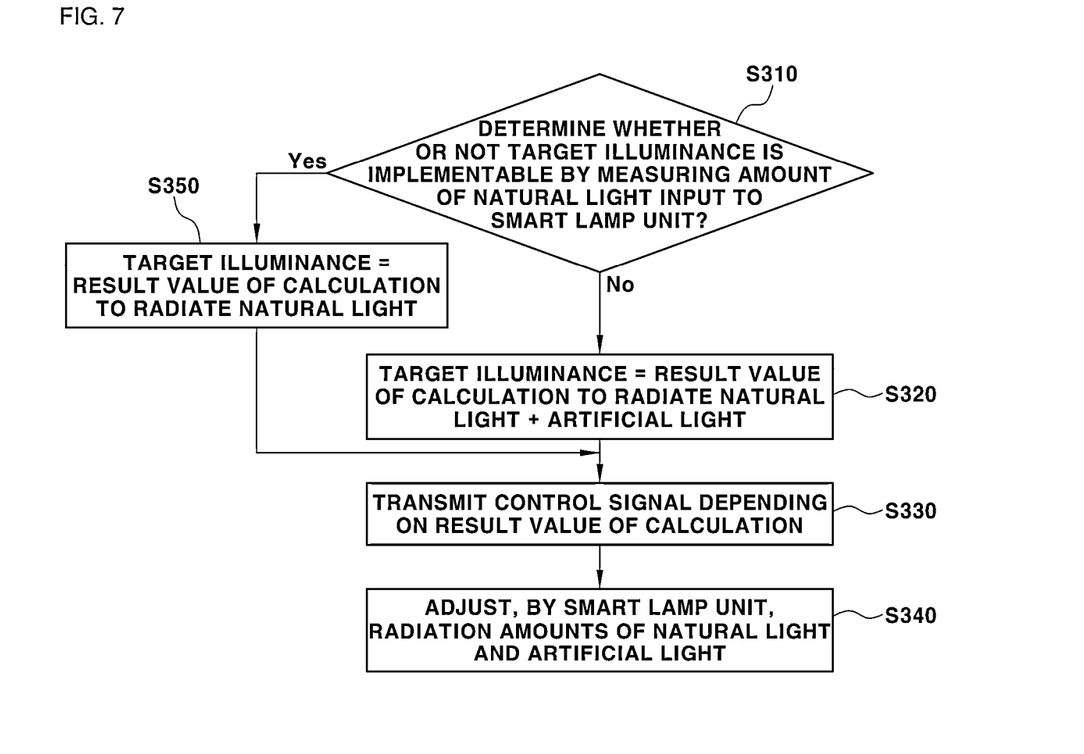
FIG. 7 is a flowchart representing control of the radiation amounts of natural light and artificial light in the method for utilizing natural light indoors according to one embodiment of the present disclosure.

FIG. 7 is a flowchart representing control of the radiation amounts of natural light and artificial light in the method for utilizing natural light indoors according to one embodiment of the present disclosure.

Referring to FIG. 7, upon determining that the current indoor information does not coincide with the user request signal, the controller 500 may control the radiation amounts of natural light and artificial light (S300).

The control of the radiation amounts of natural light and artificial light (S300) may include determining, by the controller 500, whether or not a target illuminance in response to the user request signal is implementable by measuring the amount of natural light input to the smart lamp unit 300 (S310). The control (S300) may also include transmitting, by the controller 500, a control signal to instruct the smart lamp unit 300 to radiate a combination of natural light and artificial light upon determining that the target illuminance is not implementable with the measured amount of natural light (S320 and S330). The control (S3000 may also include receiving, by the smart lamp unit 300, the control signal and adjusting the radiation amounts of natural light and artificial light (S340).

In the determination as to whether or not the target illuminance in response to the user request signal is implementable by measuring the amount of natural light input to the smart lamp unit 300 (S310), when the amount of natural light transmitted by the natural light transmitter 200 is sufficient to implement the target illuminance, the controller 500 may perform a calculation so as to radiate only natural light (S350). When the amount of natural light transmitted by the natural light transmitter 200 is not sufficient to implement the target illuminance, the controller 500 may perform a calculation so as to radiate natural light and artificial light (S320). The controller 500 may transmit a control signal so as to radiate a combination of natural light and artificial light by supplying power to the artificial light generator 340 depending on a result value of the calculation (S330).

The smart lamp unit 300 may receive the control signal from the controller 500 and may selectively adjust the radiation amounts of natural light and artificial light (S340). For example, the smart lamp unit 300 may adjust the amount of natural light input from the natural light transmitter 200 and cut off the natural light. Further, the smart lamp unit 300 may adjust the intensity of artificial light emitted by the artificial light generator 340 or cut off the artificial light.

Figure 8:
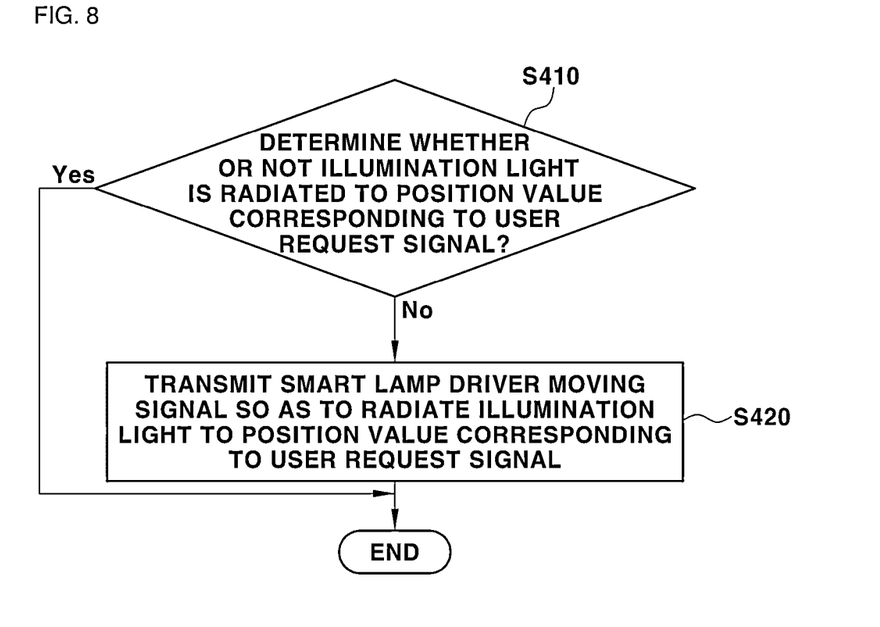
FIG. 8 is a flowchart representing adjustment of the position value of a smart lamp unit in the method for utilizing natural light indoors according to one embodiment of the present disclosure.

FIG. 8 is a flowchart representing adjustment of the position value of the smart lamp unit 300 in the method for utilizing natural light indoors according to one embodiment of the present disclosure.

Referring to FIG. 8, the adjustment of the position value of the smart lamp unit 300 (S400) may include: determining, by the controller 500, whether or not illumination light is radiated to the position value corresponding to the user request signal (S410); and transmitting, by the controller 500, a smart lamp driver moving signal to the smart lamp driver 400 so as to radiate the illumination light to the position value corresponding to the user request signal upon determining that the illumination light is not radiated to the position value corresponding to the user request signal (S420).

The controller 500 may determine whether or not the illumination light is radiated to the position value corresponding to the user request signal by sensing the position to which the illumination light is radiated through the camera unit 600 or by recognizing the amount of rotation of the first lamp housing 320. In the determination, by the controller 500, whether or not the illumination light is radiated to the position value corresponding to the user request signal (S410), when the illumination light is not radiated to the position value corresponding to the user request signal, the controller 500 may calculate the amount of movement of the first lamp housing 320 so as to radiate the illumination light to a target position.

The controller 500 may transmit the result value of the calculation for moving the first lamp housing 320 to the smart lamp driver 400. Further, the controller 500 may supply power corresponding to the result value of a calculation to move the first lamp housing 320 to the smart lamp driver 40.

In summary, the present disclosure provides the structure and method for utilizing natural light indoors or in the interior in a moving space in which the structure and method may control an illumination state so as to be appropriate for a multipurpose indoor space. The structure and method for utilizing natural light indoors or the interior of a moving space may also maximize the natural light using the natural light condenser 100 and the natural light transmitter 200 and supplement artificial light when the amount of natural light is not sufficient so as to effectively manage power for illumination.

As should be apparent from the above description, the present disclosure provides the following effects through the above-described configuration and connection and usage relations.

The present disclosure provides a structure and method for utilizing natural light indoors or in the interior in a moving space in which the structure and method may control a proper illumination state so as to be appropriate to a user request signal through a controller. The structure and method thereby are capable of providing various customized services to a user in an autonomous vehicle or a purpose-built vehicle (PBV).

Further, the structure and method for utilizing natural light indoors according to the preset disclosure may maximize natural light using a natural light condenser and a natural light transmitter and supplement artificial light when the amount of natural light is not sufficient, thereby being capable of effectively managing power for illumination.

The inventive concept has been described in detail with reference to the embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A structure for utilizing natural light indoors in a moving space, the structure comprising:
    at least one natural light condenser located outside a vehicle and configured to reflect the natural light;
    a natural light transmitter connected to one end of the at least one natural light condenser and configured such that the natural light reflected by the at least one natural light condenser is moved to the natural light transmitter;
    a smart lamp unit connected to the natural light transmitter and comprising an artificial light generator provided at a position of the smart lamp unit, at which the natural light moved to the natural light transmitter is emitted;
    a smart lamp driver located adjacent to the smart lamp unit and configured to move the smart lamp unit; and
    a controller connected to the at least one natural light condenser, the natural light transmitter, the smart lamp unit and the smart lamp driver so as to transmit and receive information therewith,
    wherein the controller is configured to combine artificial light with the natural light in response to a user request signal so as to radiate a combination of the artificial light and the natural light.

2. The structure of claim 1, wherein the at least one natural light condenser comprises:
    a first mirror formed in a semicircular shape and configured such that the natural light is incident on an inner surface thereof so as to be reflected thereby;
    a second mirror spaced apart from the first mirror and configured to reflect the natural light reflected by the first mirror; and
    a lens located at a lower end of the first mirror and configured to transmit the natural light reflected by the second mirror.

3. The structure of claim 1, wherein the smart lamp unit comprises:
    a smart light diffuser provided with the artificial light generator configured to surround the natural light emitted by the natural light transmitter;
    a first lamp housing configured to surround the smart light diffuser so as to expose an outer surface of the smart light diffuser; and
    a second lamp housing fixed to a frame of the vehicle and configured to surround the first lamp housing while being spaced apart from the first lamp housing.

4. The structure of claim 3, wherein the smart lamp driver rotates the first lamp housing based on the second lamp housing.

5. The structure of claim 1, wherein the at least one natural light condenser and the natural light transmitter respectively transmit information regarding an amount of the natural light condensed by the at least one natural light condenser and an amount of the natural light transmitted by the natural light transmitter to the controller.

6. The structure of claim 1, further comprising a camera unit configured to detect indoor image information in real time and to transmit the detected image information to the controller in real time.

7. The structure of claim 3, wherein the controller selectively controls an amount of the natural light radiated by the smart light diffuser and an amount of the artificial light radiated by the artificial light generator.

8. The structure of claim 3, wherein the controller controls the smart lamp driver so as to adjust a direction and an amount of movement of the first lamp housing.

9. The structure of claim 3, wherein the controller is configured to receive the user request signal and to transmit a signal for controlling radiation amounts of the natural light and the artificial light to the smart light diffuser.

10. The structure of claim 9, wherein the controller is configured to measure an amount of the natural light input to the smart light diffuser and to adjust power supply to the artificial light generator depending on a target illuminance value.

* * * * *